United States Patent

Kimura et al.

Patent Number: 5,673,591
Date of Patent: Oct. 7, 1997

[54] ELECTRIC CYLINDER

[75] Inventors: Kunimasa Kimura, Fujieda; Shigehiro Toyoda, Toyokawa, both of Japan

[73] Assignee: Sintokogio, Ltd., Japan

[21] Appl. No.: 544,930

[22] Filed: Oct. 18, 1995

[30] Foreign Application Priority Data

Oct. 21, 1994 [JP] Japan .................. 6-282504

[51] Int. Cl.$^6$ .................. B22C 25/00; F16H 25/22
[52] U.S. Cl. .................. 74/89.15; 254/100; 254/133 R; 266/274; 267/137; 267/141; 267/153
[58] Field of Search .................. 267/137, 141, 267/141.1, 153; 266/274; 74/89.15, 840; 254/98, 100, 133 R

[56] References Cited

U.S. PATENT DOCUMENTS

| | | | |
|---|---|---|---|
| 2,166,106 | 7/1939 | Gormley | 254/98 |
| 2,227,111 | 12/1940 | Sturm | 254/98 |
| 2,594,605 | 4/1952 | Zoppelt | 254/98 |
| 3,134,585 | 5/1964 | Trask | 267/141.1 X |
| 3,219,362 | 11/1965 | Epstein | 267/153 X |
| 3,786,551 | 1/1974 | Gregg et al. | 254/133 X |
| 4,132,825 | 1/1979 | Hahn | 267/137 |
| 4,323,345 | 4/1982 | Wallshein | 254/98 X |
| 4,712,770 | 12/1987 | Wiederkehr | 254/98 |
| 4,817,977 | 4/1989 | Bookbinder | 254/98 X |
| 5,148,714 | 9/1992 | McDiarmid | 74/89.15 |
| 5,542,335 | 8/1996 | Goodyear | 91/61 |

FOREIGN PATENT DOCUMENTS

| | | | |
|---|---|---|---|
| 5-132296 | 5/1993 | Japan | 254/98 |
| 5-39821 | 12/1993 | Japan | B22D 33/00 |
| 6-183694 | 7/1994 | Japan | 254/98 |
| 425849 | 3/1975 | U.S.S.R. | 254/98 |

*Primary Examiner*—Charles A. Marmor
*Assistant Examiner*—Nathan O. Jensen
*Attorney, Agent, or Firm*—Limbach & Limbach LLP

[57] ABSTRACT

An electric cylinder to reduce shock and damage to itself and a body to be transferred. The electric cylinder includes a rod head having a flange mounted on the distal end of a hollow piston rod, a circular polyurethane rubber plate mounted on a circular front surface of the flange, and a protection plate mounted on the front surface of the polyurethane rubber plate.

4 Claims, 1 Drawing Sheet

1

ELECTRIC CYLINDER

BACKGROUND OF THE INVENTION

1. Field of the Invention

This invention relates to an electric cylinder used as a pushing cylinder and/or a receiving and shock-absorbing cylinder to push or receive a heavy body of high temperature, such as a mold filled with molten metal.

2. Description of the Prior Art

An electric cylinder to transfer a mold or a flame filled with molten metal is disclosed in Japanese Utility Model Publication No. 5-39821 (JP-Y-5-39821). In the electric cylinder, which is used as a pushing cylinder or a receiving and shock-absorbing cylinder to handle a heavy body, when the rod head of the cylinder contacts the mold or frame, shock caused by the contact is transmitted to a nut and a ball screw which engages the nut, thereby damaging the nut and/or screw and shortening their lives, and the shock may also deform the mold thereby adversely affecting the quality of products.

SUMMARY OF THE INVENTION

This invention has been made in view of these problems. Accordingly, the purpose of the invention is to provide an electric cylinder which can absorb the shock to minimize the damage to itself as well as a body to be transferred.

To achieve the purpose, the electrical cylinder of the invention includes a piston attached to a nut threaded with a screw, driving means for rotating the screw clockwise and counterclockwise, a hollow piston rod attached to the piston, a supporting member rotatably mounted on the distal end of the screw such that the member can slide on the hollow piston rod, and a rod head mounted on the distal end of the hollow piston rod, wherein the rod head includes a flange mounted on the distal end of the piston rod, a circular polyurethane rubber plate mounted on a circular front surface of the flange, and a protection plate mounted on the front surface of the polyurethane rubber plate. The circular polyurethane rubber plate may be of a suitable size to reduce the shock. The material of the protection plate may be metal, such as steel or stainless steel, or ceramics, such as zirconia, for heat insulation and protection of the polyurethane rubber plate.

The polyurethane rubber plate absorbs shock caused by the contact between the rod head and the heavy body, thereby reducing shock to the ball screw and nut, and the heavy body. Accordingly, damage to the heavy body, such as deformation, is reduced. Also the quality of the rod head is prevented from worsening during the handling of a heavy body of high temperature.

DESCRIPTION OF THE PREFERRED EMBODIMENT

Now the embodiment of the present invention will be explained in detail by reference to the accompanying drawings.

Figure 1:
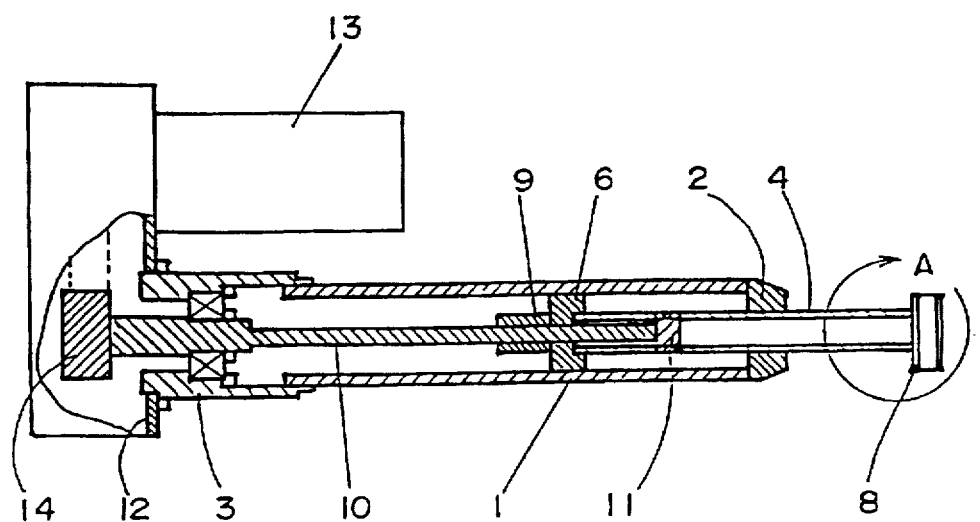
FIG. 1 is a partly cross-sectional view of an embodiment of the invention.

In FIG. 1 a cylindrical case 1 is capped at both ends by front and rear covers 2, 3, respectively. The front cover 2 has an axially formed circular opening. A hollow cylindrical piston rod 4 is disposed in the case 1 such that it extends through the circular opening of the front cover 2 and is slidable therethrough. A piston 6, which is slidable in the cylindrical case 1, is attached to the proximal end of the piston rod 4, while a rod head 8 is attached to the distal end of the piston rod 4. A nut 9 is fixedly mounted on the rear surface of the piston 6. The nut 9 is threaded with a ball screw 10. The screw 10 penetrates the piston 6 and extends into the hollow piston rod 4. A part near the proximal end of the screw 10 is covered by the rear cover 3, which closes the screw by a bearing assembly.

A cylindrical supporting body 11 is rotatably mounted on the distal end of the screw 10. The hollow piston rod 4 can slide on the supporting body 11. The proximal end of the screw 10 is connected to driving means such as a motor 13 via a transmission 14. The motor 13 is mounted on a cover 12 which is mounted on the rear cover 3 of the cylindrical case 1.

Figure 2:
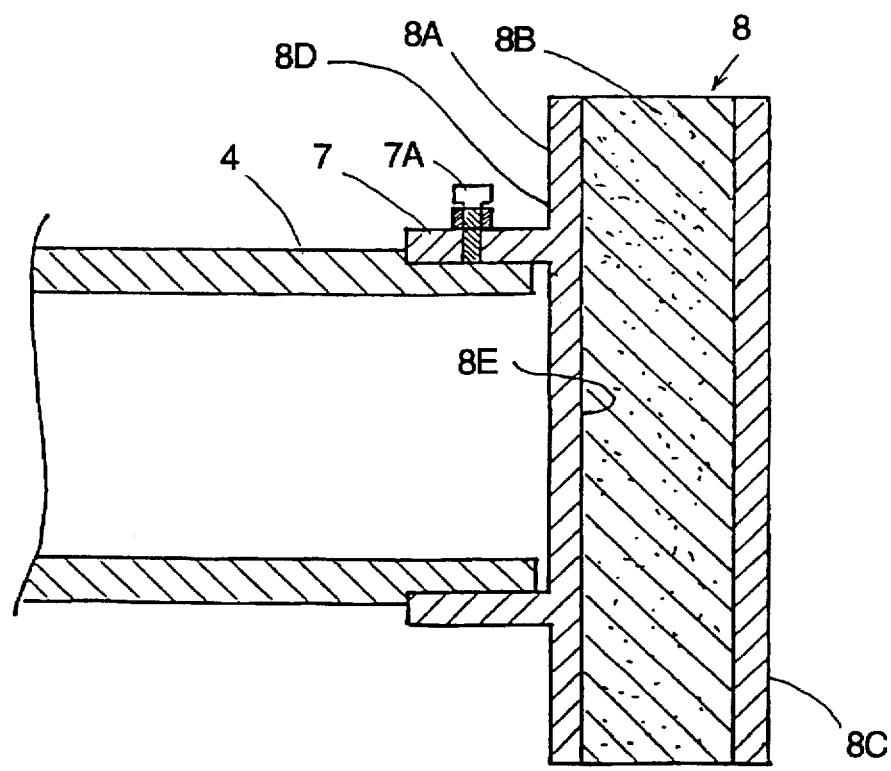
FIG. 2 is a cross-sectional view of the part A of FIG. 1.

In FIG. 2 the rod head 8 is shown in detail. The rod head 8 includes a flange 8D, a circular polyurethane rubber plate 8B, and a protection plate 8C. The flange 8D has a cylindrical joint part 7 and a circular flange part 8A. The diameter of the flange part 8A is larger than the outer diameter of the cylindrical joint part 7. The joint part 7 of the flange 8D is fitted on the distal end of the piston rod 4, and is secured to it with three stop screws 7A equidistantly provided around the joint part 7 (only one screw is shown in the drawing). The flange part 8A has a circular front surface 8E. The circular polyurethane rubber plate 8B, which has the same diameter as the circular front surface 8E of the flange 8D, is secured to the surface 8E by an using adhesive or in any other known manner. Similarly, the protection plate 8C is mounted on the front surface of the polyurethane rubber plate 8B.

A polyurethane rubber plate is suitable to absorb shock, and it has resiliency. Thus the rod head 8 that uses a polyurethane rubber plate can act as a shock absorber and accurately stop the body to be transferred in position. Since the rod head 8 receives a mold or a frame moving at a thrust of 300 Kgf and at a speed of 100 mm/s or pushes one at such a thrust and speed, with the allowable rate of compression of the polyurethane rubber plate being 20%, it must handle a load at maximum of 6.5 tons. To do so, it is found that the following conditions are suitable for the polyurethane rubber plate.

hardness 60–100, preferably 85–95 (Japanese Industry Standards)

thickness 10–40 mm, preferably 15–25 mm diameter 80–200 mm, preferably 120–140 mm It is also found that the protection plate is metal or ceramics having a heat conductivity of 3–50 W/mK. For example, steel having a heat conductivity of about 36 W/mK, stainless steel having a heat conductivity of about 12 W/mK, or zirconia having a heat conductivity of about 12 W/mK is suitable for the protection plate.

In the electric cylinder configured as described above, the protection plate 8C of the rod head 8 contacts a mold or frame filled with molten metal when the motor 13 drive the screw 10 to forward the nut 9 and piston 6 and therefore the hollow rod 4. When the mold or frame is pushed by the rod head 8, the shock of the contact is absorbed by the polyurethane rubber plate 8B, and thus the ball screw 10 and nut 9 are not adversely affected. When a mold or a frame is transferred towards the rod head 8 and contacts the latter, the protection plate 8C of the rod head 8 receives the mold or frame while the piston rod 4 is moved backwards by the motor 13 which is now reversely driven. Accordingly, the rod head 8 can stop the mold or frame at a predetermined position without adversely affecting the ball nut 9 and the screw 10. Also shock to the mold is substantially reduced.

Since in the rod head of the electric cylinder of the invention a polyurethane rubber plate is sandwiched between a flange and a protection plate, when the electric cylinder pushes a body to be transferred or receives an approaching body the shock of the contact between body and the rod head can be absorbed by the polyurethane rubber plate, thereby reducing damage to the inner part of the cylinder and the body. Further, during the handling of a mold or a frame of high temperature the polyurethane rubber plate 8B does not contact it, and also the properties of the rubber are not affected by heat and it can be used for a long time.

One skilled in the art will appreciate that the present invention can be practiced by any embodiment other than the described one, which is presented for the purposes of illustration and not of limitation, and that the present invention is limited only by the claims that follow.

What is claimed is:

1. An electric cylinder for pushing and receiving a container filled with molten metal, comprising:

a piston attached to a nut threaded with a ball screw;

driving means for rotating said ball screw clockwise and counterclockwise;

a hollow piston rod attached to said piston;

a supporting member mounted on a distal end of said screw such that said hollow piston rod can slide on said member; and a rod head mounted on a distal end of said hollow rod, wherein said rod head includes:

a flange attached to a distal end of said piston rod, said flange having a circular front surface;

a circular polyurethane rubber plate mounted on said circular surface of said flange; and a protection plate mounted on a front surface of said polyurethane rubber plate, said protection plate having a heat conductivity of 3–50 W/mk.

2. The electric cylinder of claim 1, wherein the thickness of said circular polyurethane rubber plate is 15–25 mm, and the diameter of said rubber plate is 120–140 mm.

3. The electric cylinder of claim 2, wherein said protection plate is made of steel, stainless steel, or ceramics including zirconia.

4. The electric cylinder of claim 1, wherein said protection plate is made of steel, stainless steel, or ceramics including zirconia.

* * * * *